Sept. 2, 1969       R. E. GAGNON             3,464,299
         DOUGH CUTTING, TRANSPORTING AND DEPOSITING APPARATUS
Filed April 4, 1967                         2 Sheets-Sheet 1

INVENTOR
ROBERT E. GAGNON

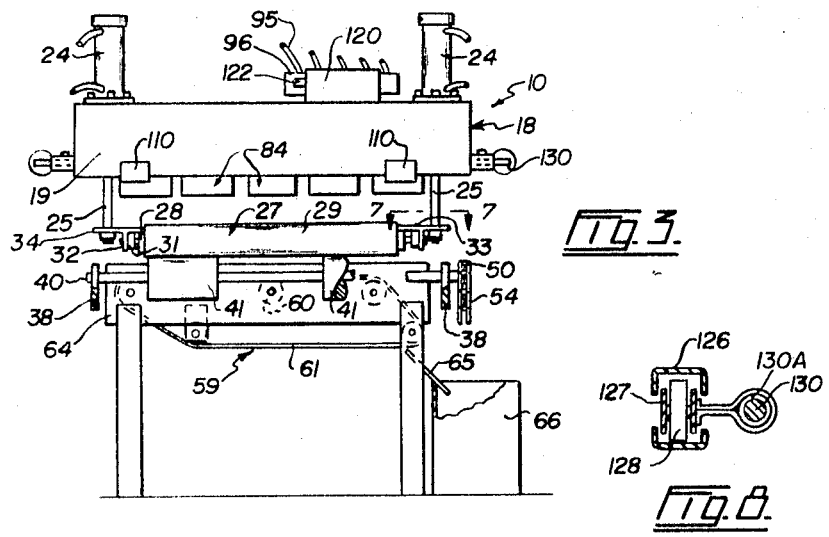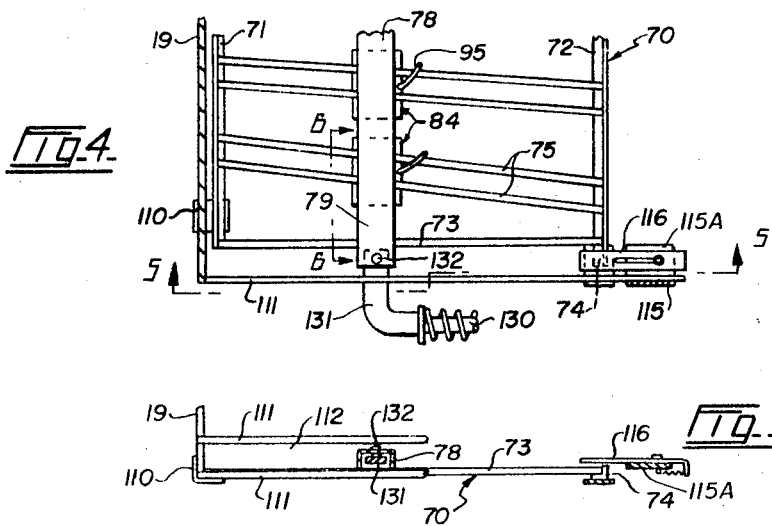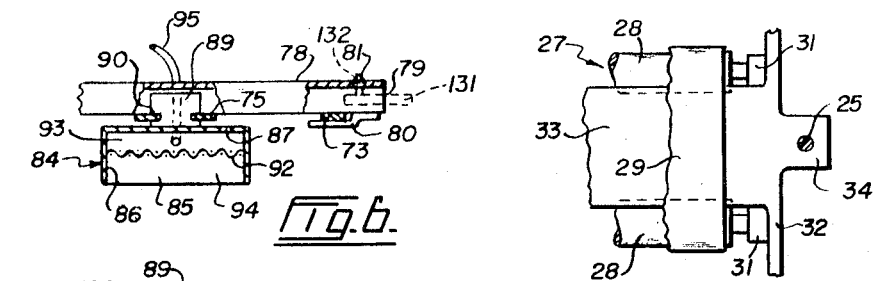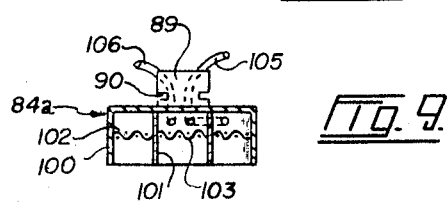

United States Patent Office 3,464,299
Patented Sept. 2, 1969

3,464,299
DOUGH CUTTING, TRANSPORTING AND
DEPOSITING APPARATUS
Robert E. Gagnon, 1367 W. 50th Ave., Vancouver 14,
British Columbia, Canada
Filed Apr. 4, 1967, Ser. No. 628,351
Int. Cl. B26d 5/08, 7/06
U.S. Cl. 83—99                                    24 Claims

ABSTRACT OF THE DISCLOSURE

An apparatus for cutting closely spaced pieces of dough from a dough sheet supported on one surface and for transporting the dough pieces to a second surface for deposit thereon in relatively widely spaced relation. The cutters serve as the means to transport the cut dough pieces to the second surface.

BACKGROUND OF THE INVENTION

This invention relates to automatic bakery equipment and more particularly to apparatus for cutting, moving and suitably arranging pieces of dough for delivery to an oven or other cooking unit.

Many modern bakeries have mechanical cutters for cutting dough into sections suitable for delivery to ovens. For example, in the production of doughnuts, it is common to cut the dough rings from a sheet of dough by the use of a machine-operated group of cutters. In order to obtain as many doughnuts as possible from a dough sheet of a given size, the cutters should be grouped together for their cutting stroke almost in edge-to-edge relation. However, it is not practical to deliver the dough rings to the frying equipment in the same closely spaced relation. Desirably, the dough rings are spaced far enough apart to allow for expansion so that adjacent rings will not become fused together and the doughnuts will be fried properly. Hitherto, this could only be achieved by the use of hand labour, or by the use of some auxiliary equipment designed to spread the doughnut rings apart. Whether done by hand or otherwise, this additional step has generally meant a slowing of production as will as an increase in production costs.

SUMMARY OF THE INVENTION

The present invention provides a machine having a feed conveyor disposed between a delivery conveyor and a discharge conveyor. A rack is supported above the feed conveyor and the adjacent end of the discharge conveyor, the rack having a number of pairs of rails which diverge from each other towards the discharge conveyor. A crosshead is slidably mounted on the rack and a group of cutters carried by the crosshead operably engage the rails. The crosshead is adapted to be reciprocated to dispose the cutters over the feed conveyor and over the discharge conveyor. The feed conveyor receives the leading portion of a dough sheet from the delivery conveyor and when said leading portion is disposed beneath the closely spaced group of cutters, the feed conveyor momentarily is raised to lift the dough sheet into cutting engagement with the cutters. The cutters retain the cut-out pieces of dough during movement of the crosshead until a position is reached over the discharge conveyor whereupon the dough pieces are ejected on to said conveyor. At this time, the cutters are widely spaced apart by virtue of their connection to the diverging pairs of rails so that the dough pieces are deposited on the discharge conveyor in correspondingly spaced relation. The apparatus operates automatically at a high rate of speed and with very little supervision. As a result, the bakery output is high and production costs are low.

BRIEF DESCRIPTION OF THE DRAWINGS

FIGURE 1 is a plan of the dough cutting and transporting apparatus, in accordance with the present invention,
FIGURE 2 is a side elevation of the apparatus,
FIGURE 3 is a vertical section taken on the line 3—3 of FIGURE 2,
FIGURE 4 is an enlarged fragmentary section taken on the line 4—4 of FIGURE 2 showing details of a rack with other parts omitted,
FIGURE 5 is a section taken on the line 5—5 of FIGURE 4,
FIGURE 6 is an enlarged section taken on the line 6—6 of FIGURE 4,
FIGURE 7 is an enlarged section taken on the line 7—7 of FIGURE 3,
FIGURE 8 is a detail section taken on the line 8—8 of FIGURE 2, and
FIGURE 9 is a section of a modified cutter.

DESCRIPTION OF THE PREFERRED EMBODIMENTS

Referring to the drawings, the numeral 10 indicates generally a frame on which aligned delivery and discharge conveyors 11 and 12 are mounted. The ends 14 and 15 of the two conveyors are spaced apart a short distance and the conveyors are separately driven by suitable means, not shown, in the direction of arrows 16 and 17 of FIGURES 1 and 2.

Frame 10 has an elevated portion 18 which overlaps the end 15 of the discharge conveyor 12 and projects towards the conveyor end 14. The frame portion 18 includes a cross member 19 and parallel side members 20.

Mounted on each end of the cross member 19, is a vertically disposed double acting air cylinder 24 having a piston rod 25. The lower ends of the rods 25 are connected to a feed conveyor 27, see particularly, FIGURES 2, 3 and 7. As shown best in FIGURE 7, conveyor 27 has a pair of parallel rollers 28 over which an endless belt 29 is trained, the belt being substantially the same width as the conveyors 11 and 12. The rollers 28 are journalled in bearings 31 (see FIGURE 7 only) carried by end plates 32. A horizontal bearer 33 connects the end of plates 32, and the top run of the belt 29 is slidably supported by this bearer. Laterally projecting lugs 34 are fitted to the end plates 32 and the lower ends of the rods 25 are suitably secured to these lugs.

Near the end 14 of the delivery conveyor 11, the frame 10 is provided with depending lugs 36, there being one such lug on each side of said conveyor. Secured to each lug 36, by means of a pivot pin 37, is an arm 38. The arms 38 project beyond the conveyor end 14 and are cross connected by a shaft 40. Transversely spaced friction wheels 41 are mounted on the shaft 40. The opposite ends of the arms 38 are fitted with pivotally mounted, depending rods 43 shown best in FIGURE 2. Brackets 44 are mounted on frame parts 45 and the rods 43 slidably extend through said brackets. The lower ends of the rods 43 have collars 46 and springs 47 are interposed between said collars and the brackets 44. The springs 47 exert resilient pressure on the arms 38 which tends to rock said arms about their pivot pins 37 and swing the friction wheels 41 upwardly into driving engagement with the underside of the belt 29.

One end of the shaft 40 carries a small sprocket 50. A similar sprocket 51 is mounted on a spindle 52, the spindle being secured to a frame part 53. Sprockets 50 and 51 are connected by an endless chain 54. A chain and sprocket drive 55 connects the spindle 52 to a suitable part of the drive to the conveyor 11 so that the friction wheels 41 are driven counterclockwise as viewed in FIGURE 2.

Thus, the feed conveyor 27 is driven in the same direction as the delivery and discharge conveyors 11 and 12 and at a speed substantially equal to that of said delivery conveyor.

Mounted on a suitable part 58 of the frame 10, between the feed conveyor 27 and the end 15 of the discharge conveyor 12, is a transversely extending scrap conveyor 59. As shown in FIGURES 2 and 3, this scrap conveyor has a number of rollers 60 which support an endless belt 61. One roller 60 is mounted on a suitably driven shaft 62 which, for the sake of clarity, is shown extending to the right of FIGURE 2. Belt 61 is bordered by a trough 64 which leads to a chute 65. A suitable receptacle 66 is positioned below the chute 65. The scrap conveyor 59 is driven so that the upper run thereof travels towards the receptacle 66.

The dough cutting and transporting apparatus is provided with cutter supporting means which, in the embodiment illustrated, consists of a rectangular rack 70. Rack 70 has cross bars 71 and 72 which are connected by a pair of side bars 73. The opposite ends 74 of the bar 72 project laterally beyond the side bars 73. Extending between the bars 71 and 72 are a number of pairs of rails 75, each rail being formed of a flat strip of metal. The pairs of rails 75 diverge from each other from the bar 71 to the bar 72.

Slidably mounted on top of the pairs of rails 75, is a crosshead 78 preferably formed of a length of inverted channel. The opposite ends 79 of the crosshead 78 also project beyond the side bars 73 and these projecting ends are fitted with guide clips 80 (FIGURE 6) which engage said side bars. An opening 81 is formed in each end 79 of the crosshead near the clip 80, see FIGURE 6 only.

The rack 70 is provided with a plurality of dough cutters 84. As best illustrated in FIGURE 6, the cutters 84 are rectangular and have side walls 85, end walls 86 and top walls 87. Upwardly extending rectangular bosses 89 are provided on the top walls 87 and these bosses are slidably received in the crosshead 78. Grooves 90 are provided in the ends of the bosses 89 on each cutter and a pair of rails 75 project into these grooves. The hollow cutters 84 are divided by horizontal screens 92 into upper and lower chambers 93 and 94. A flexible air hose 95 is secured to a side wall 85 of each cutter to communicate with the chamber 93. The hoses 95 of all the cutters are connected to a header 96 which has a male coupling 97, see FIGURES 1 and 2.

The apparatus is provided with a number of racks similar to the one above described, the several racks making up a set. Each rack of the set has cutters designed to cut dough pieces of a particular shape. For example, a rack is provided fitted with cutters 84a (see FIGURE 9) for cutting doughnut rings. Each cutter 84a has an outer sleeve 100 and an inner sleeve 101 concentric therewith. Both sleeves are divided horizontally by screens 102 and 103. An air hose 105 is connected to the interior of the sleeve 100 and the sleeve 101 is similarly connected by a hose 106. Hoses 105 and 106 are each connected to a suitable header having a male coupling, which header and coupling are not illustrated in the drawings.

The rack 70 is adapted to be supported in the elevated portion 18 of the frame 10. To this end, the cross member 19 is fitted with transversely spaced hangers 110. Supported below the side members 20, are guide strips 111 (shown in detail in FIGURE 5) in which longitudinal slots 112 are formed. The members 20 each support a depending L-shaped hanger 115, see FIGURES 4 and 5, only, the inwardly projecting lower leg 115A of this hanger supporting a spring-pressed latch 116. To mount the rack 70 in the frame portion 18, the cross bar 71 is placed in the hangers 110. The opposite ends 74 of the cross bar 72 are lowered on to the legs 115A of the hangers 115 with the latches 116 withdrawn. When the latches 116 are released to engage the ends 74 of the cross bar 72, the rack 70 is locked in its operating position within the portion 18 of the conveyor frame.

Mounted on the cross member 19 of the frame portion 18, it a fitting 120 having a female coupling 121, see FIGURES 1, 2 and 3. A pipe 122 connects the fitting 120 to a suitable source of suction and air pressure, not shown. The couplings 97 and 121 are joined together to connect the cutters 84 to the above mentioned source of pressure and vacuum.

Horizontal guide channels 126 are supported by the frame 10 on the sides of the portion 18 to the right of the hangers 115. The channels 126 slidably enclose and provide a path of travel for reciprocating arms 127 which are fitted with longitudinally spaced rollers 128, see FIGURE 8. Spring-pressed plungers 130 are opposite slidably mounted in laterally projecting sleeve bearings 130A carried on the left ends of the arms 127 and the opposite ends 131 of these plungers project inwardly through the slots 112 of the guide strips 111. Vertical pins 132 are mounted on the free ends 131 of the plungers. The upwardly extending pins 132 project through the openings 81 in the ends 79 of the crosshead 78. Thus, the crosshead 78 is operatively connected to the driving means therefor.

Journalled in the frame 10 over the right end of the conveyor 12, is a cross shaft 136. This shaft is fitted with two widely spaced discs 137, each disc having a radially extending crank 138. The cranks 138 are pivotally connected to the right ends of the arms 127 by elongated links 140. A sprocket 141 is secured to the shaft 136, said sprocket being fitted with a chain 142 which is driven from a suitable motor, not shown.

Thus, the crosshead 78 is operatively connected to the driven shaft 136. As the shaft 136 rotates, the crosshead 78 is caused to reciprocate on the pairs of rails 75 between the bars 71 and 72. When the crosshead reaches the end of its stroke to the left, and has been halted over the conveyor 27, the cranks 138 have not quite reached horizontal alignment with the links 140. In other words, the arms 127 continue to move to the left. During the time the arms 127 complete their stroke to the left and start their stroke to the right, the plungers 130 move endwise in their sleeve bearings 130A and are retracted slightly against the pressure of their springs. Retraction of the plungers 130 permits the crosshead to remain stationary for a brief moment during which the cutters 84 are disposed directly over the feed conveyor 27.

A dough rolling machine 148 is mounted over the left end of the conveyor 11, see FIGURE 2. This machine is adapted to supply the conveyor 11 with a sheet 146 of dough. The dough sheet 146 is deposited on the conveyor 11 by the machine in the form of a continuous strip of uniform thickness and width. The apparatus cuts pieces 147 from the sheet 146, see FIGURES 1 and 2, and transports the pieces for deposit on the conveyor 12.

To start the dough cutting and transporting operation, the several conveyors are set in motion and the drive means for the crosshead is started to reciprocate the cutters 84. The machine 145 is started to feed the dough strip on to the conveyor 11. As the leading portion of the dough sheet approaches the conveyor end 14, the operator lifts said leading portion and places it on the feed conveyor 27. When the leading portion of the dough sheet passes the centre of the feed conveyor, the cylinders 24 are pressurized to raise said conveyor and lift the dough sheet into cutting engagement with the cutters 84. As the cutters slice through the dough, suction is applied to retain the pieces 147 within the lower chambers 94 of the cutters. Conveyor 27 is then lowered into driving contact with the friction wheels 41 whereupon the scraps left by the removal of the dough pieces drop off the end of the feed conveyor and fall on to the scrap conveyor 59. Conveyor 59 moves the scrap pieces of dough forward so that they fall through the chute 65 into the receptacle 66.

As soon as the feed conveyor is lowered away from the cutters 84, the crosshead 78 is moved to the right end of the rack 70. When the cutters are positioned over the end 15 of the discharge conveyor, the suction retaining the dough pieces 147 within the cutters is cut off and air pressure is fed through the air hoses 95 to eject the pieces from the cutters. The dough pieces 147 fall upon the conveyor 12 and are carried away for baking or frying. The cutters 84, which are practically in side-edge to side-edge contact when the dough pieces are cut, are spread apart by the diverging pairs of rails 75 as the crosshead travels from left to right. The cutters are relatively widely spaced apart over the end 15 of the conveyor 12 and it is in this position that the dough pieces are ejected from the cutters on to the discharge conveyor. It is essential that the dough pieces be spaced apart in this manner to ensure proper baking or frying. As the dough pieces are deposited on the discharge conveyor, the cutters are returned to the starting position over the conveyor end 14. This completes one cycle of operation, and places the several parts in position to commence the next cycle which is carried out immediately.

It will be noted that the flow of air to the cylinders 24 is controlled by a solenoid operated valve, not shown, and that an electric switch, also not shown, is mounted on a suitable part of the apparatus so as to be actuated each time the cutters 84 approach a position over the conveyor 27. In a like manner, the suction and air pressure supply to the cutters 84 is controlled automatically. Since such control equipment is well known, detailed description is not considered necessary.

Thus, the apparatus operates automatically to cut pieces of dough from a dough sheet on the delivery conveyor, to transport the dough pieces to the discharge conveyor and at the same time, to spread said pieces apart for deposit on the discharge conveyor in properly spaced relation. The apparatus operates in this manner without interruption and at a high rate of speed which ensures a high volume output for the bakery. The operator periodically empties the receptacles 66 into the dough rolling machine 145 where the scraps are re-rolled and again deposited on the conveyor 11 in the form of a continuous sheet. Apart from initially feeding the leading portion of the dough sheet on to the conveyor 27 and occasionally emptying the receptacle 66, the operator need only make an occasional check of the apparatus which is otherwise fully automatic in its operation.

I claim:

1. Apparatus for cutting, transporting and depositing pieces of material and comprising a support member, a plurality of cutters carried by the support member, means for reciprocating the cutters to dispose said cutters in cutting position near one end of the support member and in depositing position near the opposite end of said support member, and means operating automatically in response to reciprocation of the cutters for grouping the cutters together in closely spaced relation when in the cutting position and for spreading said cutters apart in relatively widely spaced relation when in the depositing position.

2. Apparatus as claimed in claim 1, and including means for retaining the pieces within the cutters after said cutters have cut through the material and during reciprocation of said cutters from the cutting position to the depositing position.

3. Apparatus as claimed in claim 2, in which said material is supported on a supporting surface normally spaced from the cutters when said cutters are in the cutting position and means for momentarily bringing the cutters into cutting engagement with the material supported on the supporting surface.

4. Apparatus as claimed in claim 3, in which said supporting surface is provided by a feed conveyor, and means for driving the feed conveyor intermittently in the direction of travel of the cutters moving from the cutting position to the depositing position.

5. Apparatus as claimed in claim 4, in which said feed conveyor is disposed between adjacent ends of a delivery conveyor and a discharge conveyor, said means for driving the feed conveyor operating said feed conveyor at substantially the same speed as the speed of advancement of the delivery conveyor.

6. Apparatus for cutting pieces of dough from a dough sheet advanced thereto by a delivery conveyor and transporting said dough pieces to a discharge conveyor for deposit thereon, said apparatus comprising a feed conveyor mounted between adjacent ends of the delivery and discharge conveyors, a rack supported horizontally over the feed conveyor and the adjacent end of the discharge conveyor, a crosshead slidably mounted on the rack, a plurality of cutters mounted on the crosshead for sliding movement endwise thereof, means for reciprocating the crosshead to dispose the cutters in a cutting position over the feed conveyor and in a depositing position over the adjacent end of the discharge conveyor, and means for momentarily raising the feed conveyor to move the leading portion of the dough sheet into cutting engagement with the cutters.

7. Apparatus as claimed in claim 6, and including means for increasing the spacing between the cutters as said cutters are moved from cutting position to depositing position.

8. Apparatus as claimed in claim 6, and including means for driving the feed conveyor intermittently at substantially the same speed as the delivery conveyor.

9. Apparatus as claimed in claim 6, and including means for retaining the dough pieces within the cutters during movement of said cutters from the cutting position to the depositing position and for ejecting said dough pieces from said cutters in said depositing position.

10. Apparatus as claimed in claim 6, in which said means for reciprocating the crosshead includes a spring-pressed plunger operatively connecting said crosshead to said reciprocating means, said plunger moving relative to the reciprocating means whereby the crosshead momentarily is halted when the cutters are in the cutting position.

11. Apparatus as claimed in claim 6, and including a scrap conveyor mounted between the feed conveyor and the discharge conveyor, said scrap conveyor being adapted to receive scrap dough left on the feed conveyor by the cutters.

12. Apparatus for cutting pieces of dough from a dough sheet advanced thereto by a delivery conveyor and transporting said dough pieces to a discharge conveyor for deposit thereon, said apparatus comprising a frame, a feed conveyor mounted in the frame between adjacent ends of the delivery and discharge conveyors, a rack supported by the frame to extend over the feed conveyor and the adjacent end of the discharge conveyor, said rack having a plurality of pairs of rails, said pairs of rails diverging from the feed conveyor end of the rack to the discharge conveyor end of said rack, a crosshead slidably mounted on the rack, a plurality of cutters slidably mounted in the crosshead and depending therebelow, each of said cutters being operatively engaged by one pair of said pairs of rails, means for reciprocating the crosshead to dispose the cutters in a cutting position over the feed conveyor and in a depositing position over the adjacent end of the discharge conveyor, means for driving the feed conveyor intermittently at substantially the same speed as the delivery conveyor, means for momentarily raising the feed conveyor to move the leading portion of the dough sheet into cutting engagement with the cutters, said cutters each having a hollow body, means for reducing air pressure within the hollow bodies of the cutters to retain dough pieces therein during reciprocation of the crosshead from the feed conveyor end of the rack to the discharge conveyor end of the rack and for momentarily pressurizing said hollow bodies to eject the dough pieces on to the discharge conveyor.

13. Apparatus as claimed in claim 12, in which said means for driving the feed conveyor includes a friction wheel rotatably mounted on an end of a supporting arm, said supporting arm being pivotally mounted on the frame, a spring connecting the arm to the frame and adapted to urge the friction wheel into driving contact with the feed conveyor, and means for rotating the friction wheel to drive the feed conveyor in the same direction and at substantially the same speed as the delivery conveyor.

14. Apparatus as claimed in claim 12, in which the means for raising the feed conveyor includes a pair of fluid cylinders mounted on a frame part above the rack, said pair of fluid cylinders each having a vertically disposed piston rod operatively connected to an adjoining end of the feed conveyor and means for conducting fluid under pressure to the ends of the pair of fluid cylinders.

15. Apparatus as claimed in claim 12, and including a scrap conveyor mounted between the feed conveyor and the discharge conveyor, said scrap conveyor being disposed below and at right angles to the feed conveyor to receive scrap dough therefrom, and means for driving the scrap conveyor in a direction normal to the direction of travel of the scrap conveyor.

16. Apparatus for cutting pieces of dough from a dough sheet comprising a plurality of rail means extending side by side longitudinally of the apparatus and diverging relative to each other from one end to the opposite end thereof, a cutter slidably mounted on each rail means, means for reciprocating the cutters on the rail means whereby said cutters are alternately close together and spaced laterally apart at said one ends and said opposite ends respectively of the rail means, means for supporting a dough sheet beneath said one ends of the rail means, means for bringing the cutters into cutting engagement with the dough sheet on the supporting means, said cutters retaining therein pieces cut from the dough sheet to transport said pieces to said opposite ends of the rail means.

17. Apparatus as claimed in claim 16, and including means for ejecting said dough pieces from the cutters.

18. Apparatus as claimed in claim 16, in which said means for reciprocating the cutters comprises a crosshead extending transversely of the rail means and mounted for movement generally longitudinally thereof, means slidably connecting the cutters to the crosshead for movement longitudinally of the latter, and means for reciprocating the crosshead generally longitudinally of the rail means.

19. Apparatus as claimed in claim 18, in which said means for reciprocating the crosshead includes a spring-pressed plunger operatively connecting said crosshead to said reciprocating means, said plunger being movable relative to the reciprocating means whereby the crosshead momentarily is halted when the cutters are at said one ends of the rail means.

20. Apparatus as claimed in claim 16, and including suction means connected to the cutters, means for operating the suction means to retain the dough pieces in the cutters when said cutters are at said one ends of the rail means, and means for stopping the suction means to release the dough pieces when the cutters are at said opposite ends of the rail means.

21. Apparatus as claimed in claim 16, in which said means for bringing the cutters into cutting engagement with the dough sheet comprises means for moving said supporting means towards the cutters to press the dough sheet against said cutters.

22. Apparatus as claimed in claim 16, in which each cutter is a hollow body having an annular cutting edge, and including means connected to each hollow body for selectively applying suction thereto removably to hold dough pieces therein.

23. Apparatus for cutting dough pieces from a dough sheet comprising a rack having pairs of rails extending side by side longitudinally of said rack and diverging relative to each other from one end to the opposite end thereof, a crosshead extending transversely of the rack and mounted for movement generally longitudinally thereof, a plurality of cutters slidably mounted in the crosshead and depending therebelow, each of said cutters being operatively engaged by one pair of said pairs of rails, means for reciprocating the crosshead to dispose the cutters in a cutting position at said one ends of the pairs of rails and in a depositing position at said opposite ends of said pairs of rails, said cutters each having a hollow body and means for reducing air pressure within the hollow bodies of the cutters to retain dough pieces therein during reciprocation of the crosshead from the cutting position to the depositing position.

24. Apparatus as claimed in claim 23, and including means for momentarily pressurizing said hollow bodies to eject the dough pieces at the depositing position.

References Cited

UNITED STATES PATENTS

| 1,039,795 | 10/1912 | Pfenninger | 83—107 X |
| 2,849,064 | 8/1958 | Huyck | 83—155 |
| 3,101,021 | 8/1963 | Johnson | 83—99 |
| 3,248,980 | 5/1966 | Downing | 83—99 X |

FRANK T. YOST, Primary Examiner

U.S. Cl. X.R.

83—107, 152, 155, 280, 566